United States Patent [19]

Smith

[11] Patent Number: 5,610,453
[45] Date of Patent: Mar. 11, 1997

[54] PULSEWIDTH MODULATION (PWM) FREQUENCY SLIDER

[75] Inventor: Enoch P. Smith, Milwaukee, Wis.

[73] Assignee: Allen-Bradley Company, Inc., Milwaukee, Wis.

[21] Appl. No.: 406,615

[22] Filed: Mar. 20, 1995

[51] Int. Cl.$^6$ .................................................. H01H 35/00
[52] U.S. Cl. .......................... 307/116; 307/117; 307/130; 307/131; 307/132 EA; 307/134; 307/135; 307/139; 307/140
[58] Field of Search .................................. 307/116, 117, 307/130, 131, 132 EA, 134, 135, 139, 140

[56] References Cited

U.S. PATENT DOCUMENTS

| | | | |
|---|---|---|---|
| 3,782,113 | 1/1974 | Luongo | 60/73 |
| 4,727,450 | 2/1988 | Fachinetti et al. | 361/103 |
| 5,428,319 | 6/1995 | Marvin et al. | 331/176 |

Primary Examiner—William M. Shoop, Jr.
Assistant Examiner—Kim Lockett
Attorney, Agent, or Firm—Patrick S. Yoder; John M. Miller; John J. Horn

[57] ABSTRACT

A frequency slider circuit for reducing power dissipation in the form of switching losses in a switching device when the switching device is near its desired maximum temperature limit is disclosed herein. The switching device controls an electric load, such as a motor. The frequency slider circuit samples a current of the switching device. The frequency slider circuit then uses a current transducer to convert the current to a signal level. The signal level is then processed by a model of the thermal response of the switching device. The output of the thermal model is compared to a reference signal, and if the output of the thermal model is greater than the reference signal, the switching frequency of the switching device will be lowered gradually to keep the power generated during the switching periods to be below a predetermined value. A minimum frequency clamping circuit is included to ensure that the switching frequency never drops below a minimum value, to ensure stable operation of the switching device. The frequency slider can also operate to sample a voltage across the switching device to determine the estimated temperature of the switching device, or to use both the current and the voltage of the switching device to determine the estimated temperature.

32 Claims, 6 Drawing Sheets

PULSEWIDTH MODULATION (PWM) FREQUENCY SLIDER

BACKGROUND OF THE INVENTION

1. Field of the Invention

The invention relates to a method and apparatus for reducing the power dissipation, in the form of switching losses, in a switching device. More specifically, the invention relates to a method and apparatus for estimating the temperature of the switching device controlling an electric device, such as a motor, in order to operate the switching device at an optimal switching frequency (i.e. controlling or sliding the frequency) to reduce switching losses for purposes of thermal protection.

2. Description of the Related Art

It is desirable to provide thermal protection for a semiconductor switching device by maintaining it at or below a certain maximum temperature limit both during normal operation and during the switching operation, when the switching device is switched ON or OFF. The thermal protection of a switching device, which may have high power dissipation under both stable and transitory operating conditions, better ensures temperature stability and, therefore, reliable operation. Conventional methods of providing thermal protection for a switching device involves measuring the actual temperature of the switching device, and adjusting the switching frequency to an optimal level based on the measured temperature.

For such purposes, "switching frequency" refers to the rate or interval at which the switching device, such as a transistor, is switched ON or OFF. For example, if a transistor is switched ON and OFF continuously at a 1 millisecond interval, it is said to have a 1 kHz switching rate. During each switching interval, power is generated by the switching device as a result of slew rate of the voltage and the current supplied to the switching device. This generated power is dissipated in the form of losses in the switching device. The total power losses of a switching device consist of switching loss and conduction loss. The magnitude of the switching loss is a function of the switching frequency and the amount of the current (I) conducted through the switching device. The magnitude of the conduction loss is a function of the amount of current (I) passing through the switching device. Power generated by such losses is absorbed by the switching device in the form of thermal energy, or heat, which typically increases the temperature of the switching device, and in turn must be dissipated from the switching device to the environment by heat transfer methods, such as radiation, convection and conduction.

FIG. 1 shows typical voltage and current curves for a typical semiconductor switching device. As shown in FIG. 1, when the switching device is turned ON, the voltage V drops at a particular slew rate (or slope) between times $T_1$ (the time the switching device is provided the ON signal) and $T_2$ (the time the switching device is in the steady-state of ON), and the current I increases at a particular slew rate during this same time period. The interval between times $T_1$ and $T_2$ corresponds to the switching ON time. When the switching device is turned OFF, the voltage increases at a particular slew rate, and the current decreases at a particular slew rate between times $T_3$ (the time the switching device is provided the OFF signal) and $T_4$ (the time the switching device is in the steady-state of OFF). The interval between times $T_3$ and $T_4$ corresponds to the switching OFF time.

In FIG. 1, the slew rates are shown as being the same for the ON and OFF times for both the current and voltage levels in the switching device. However, this need not necessarily be the case, and all slew rates may vary based upon whether the switching device is switched ON or OFF. For example, the time it takes the voltage to drop from its high (OFF) level to its steady-state low level (ON) between times $T_1$ and $T_2$ may be less than the time it takes the voltage to increase from the steady-state low level to the high level between times $T_3$ and $T_4$.

When the switching device is operating in its normal state (i.e., during the steady-state period between an ON or an OFF switching time interval), there is a current value of $I_L$ and a voltage value of $V_L$ being supplied to the switching device, and this is shown between times $T_2$ and $T_3$ of FIG. 1. The switching loss corresponds to the power generated during interval from times $T_1$ to $T_2$ (when the switching device is turning ON) and during the interval from times $T_3$ to $T_4$ (when the switching device is turning OFF), while the conduction loss corresponds to the power generated during the interval between times $T_2$ and $T_3$ (when the switching device is ON).

The time or interval between consecutive turning ON and turning OFF of the switching device defines the switching rate, or switching period. At a faster switching rate, the switching device has less time between switching intervals to dissipate through heat transfer to the environment, the total power generated by the switching operation and absorbed as thermal energy within the switching device during each switching period. As a result, the switching device will be absorbing more thermal energy than it is transferring to the environment and its temperature typically will increase as a result of the increasing residual between power generated and thermal energy dissipated. (Note that the heat generated during the switching periods is typically much greater than the heat generated during the conduction periods; however, since the switching times (i.e., the interval between times $T_1$ and $T_2$ and times $T_3$ and $T_4$) are typically smaller than the normal operating periods of the switching device, this does not present too much of a problem.) As a result, when the switching device is operating at a high switching rate, the temperature of the switching device may increase beyond acceptable limits.

U.S. Pat. No. 4,727,450, entitled "Temperature Measuring, Protection and Safety Device, Thermal Protection Device Using the Temperature Measuring Device and Electronic Power Controller Using the Thermal Protection Device" (the '450 patent), issued on Feb. 23, 1988, describes a method for controlling the temperature of an electronic power controller.

The device disclosed in the '450 patent utilizes an initialization device for setting a thermal model to an operating point representative of the actual thermal state of the circuit to be protected. The real (actual) temperature of the electronic power controller is measured and, based on that temperature, appropriate thermal protection is effected by cutting off power to the circuit. The device disclosed in the '450 patent also utilizes a thermometer to set the initial conditions in the initialization circuit.

Although the device of the '450 patent may provide thermal protection for a switching device, it is desirable to have a thermal protection device that does not cut off power to the circuit when the temperature of the switching devices gets too high, but instead adjusts the switching frequency of the switching device in a manner that allows continued operation without risk of thermal damage to the switching device.

Further, in many applications it is undesirable to have a thermal protection device which requires an initialization device in order to set up the thermal model for determining if the device is operating at too high a temperature, as is disclosed in the '450 patent.

SUMMARY OF THE INVENTION

The present invention relates a method for controlling the temperature of and thereby providing thermal protection for a switching device operating to switch a current within a desired frequency range to control an electric device. The method includes the step of generating a signal representative of the switching device. The method further includes the step of estimating the temperature of the switching device based on the signal. The method also includes the step of comparing the estimated temperature of the switching device to a predetermined temperature reference level. The method also includes the step of reducing a switching frequency of the switching device within the desired frequency range when the estimated temperature exceeds the predetermined temperature reference level.

The present invention also relates to an apparatus for controlling the temperature of and thereby providing thermal protection for a switching device operating to switch a current within a desired switching frequency range to control an electric device. The apparatus includes a current transducer circuit coupled to the switching device. The current transducer circuit is configured to monitor the load current and to provide a signal level based on the load current. A temperature predictor circuit is coupled to the current transducer and configured to estimate the temperature of the switching device based on the signal level. The apparatus also includes a comparison circuit coupled to the temperature predictor circuit and configured to compare the estimated temperature of the switching device to a predetermined temperature reference level and to provide a comparison signal indicative of the estimated temperature of the switching device and whether it exceeds the predetermined temperature reference level. The apparatus further includes a frequency clamping circuit coupled to the comparison circuit and configured to clamp the switching frequency of the switching device at or below a maximum frequency level if the comparison signal indicates that the predicted temperature of the switching device is greater than the predetermined temperature reference level. The apparatus still further includes a temperature lowering circuit connected to the frequency clamping circuit and configured to reduce the switching frequency by a predetermined amount when the comparison signal indicates that the estimated temperature of the switching device exceeds the predetermined temperature reference level.

The present invention still further relates to an apparatus for controlling the temperature of and thereby providing thermal protection for a switching device operating to switch a current within a desired switching frequency range to control an electric device. The apparatus includes a voltage transducer circuit coupled to the switching device. The voltage transducer circuit is configured to monitor a voltage level across the switching device and to provide a signal level based on the voltage level. A temperature predictor circuit is coupled to the current transducer and configured to estimate the temperature of the switching device based on the signal level. The apparatus also includes a comparison circuit coupled to the temperature predictor circuit and configured to compare the estimated temperature of the switching device to a predetermined temperature reference level and to provide a comparison signal indicative of the estimated temperature of the switching device and whether it exceeds the predetermined temperature reference level. The apparatus further includes a frequency clamping circuit coupled to the comparison circuit and configured to clamp the switching frequency of the switching device at or below a maximum frequency level if the comparison signal indicates that the predicted temperature of the switching device is greater than the predetermined temperature reference level. The apparatus still further includes a temperature lowering circuit connected to the frequency clamping circuit and configured to reduce the switching frequency by a predetermined amount when the comparison signal indicates that the estimated temperature of the switching device exceeds the predetermined temperature reference level.

The present invention provides an apparatus for controlling the temperature of and thereby providing thermal protection for a switching device operating to switch a current at a desired frequency to control an electric device. The apparatus includes means for generating a signal representative of the load current supplied to the electric device by the switching device. The signal can be based either on the current output from the switching device, a level of voltage measured across the switching device, or a combination of the two. The apparatus further includes means for estimating the temperature for the switching device based on the signal. The apparatus also includes means for comparing the predicted temperature to a predetermined temperature reference level. The apparatus still further includes means for reducing the switching frequency of the switching device below the operating frequency (within a desired frequency range for the application) when the estimated temperature exceeds the predetermined temperature reference level.

BRIEF DESCRIPTION OF THE DRAWINGS

The component elements of the invention are illustrated by the following description with reference to the following accompanying drawings.

DETAILED DESCRIPTION OF THE PREFERRED EMBODIMENTS

The frequency slider as described herein regulates the switching frequency of the switching device based on a level of current measured from the electric device that it controls, i.e., the load current. If the current is determined to be above a predetermined value then, based on the switching frequency of the switching device, the switching frequency may be reduced so that the total power dissipated and resultant thermal energy generated during the switching operation and thereby absorbed by the switching device is likewise reduced to protect the switching device from thermal damage such as overheating, burn out or other harm.

Referring back to FIG. 1, the power dissipated between times $T_1$ and $T_2$, plus the power dissipated between times $T_3$ and $T_4$ is considered the switching loss, and for a fixed current in the switching device, this power loss is only dependent on the switching interval (i.e., the switching frequency). The power loss between times $T_2$ and $T_3$, i.e., the conduction loss, is dependent upon how much current is being switched by the switching device.

Figure 2:
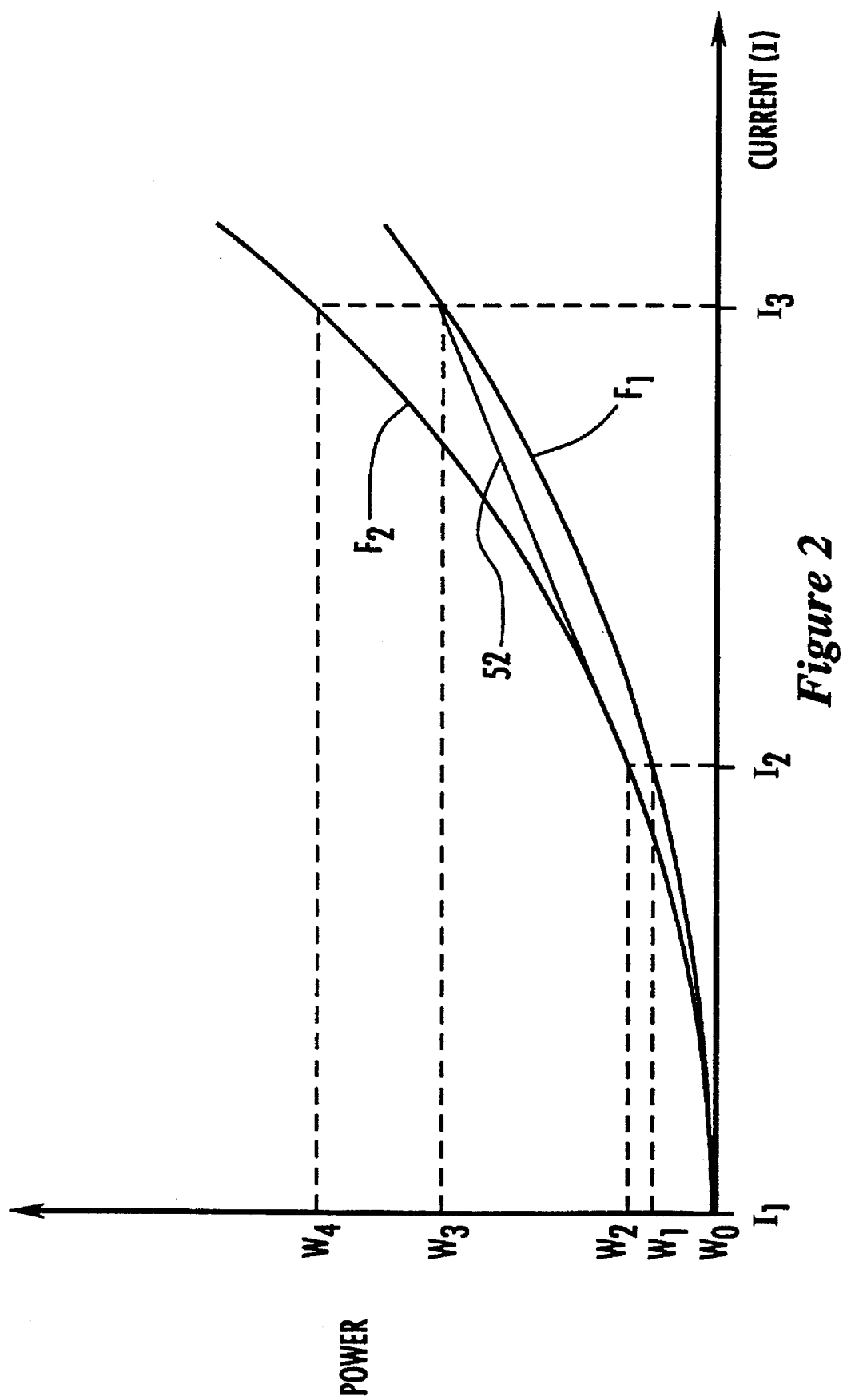
FIG. 2 shows a diagram of power as a function of current for a switching device under control of a frequency slider according to the preferred embodiment of the invention.

Referring now to FIG. 2, when the switching device has a switching rate of $F_1$ switches per second, a current level of $I_1$ amps corresponds to $W_0$ watts of power generated of the switching device, a current level of $I_2$ amps corresponds to $W_1$ watts of power generated by the switching device, and a current level of $I_3$ amps corresponds to $W_3$ watts of power generated by the switching device.

When switching device has a higher switching rate of $F_2$ switches per second, a current level of $I_1$ amps corresponds to $W_0$ watts of power generated by the switching device, a current level of $I_2$ amps corresponds to $W_2$ watts of power generated by the switching device, and a current level of $I_3$ amps corresponds to $W_4$ watts of power generated by the switching device. A current level of zero amps may not necessarily correspond to a voltage level of zero volts, due to voltage-only losses in the switching device (e.g., $I_1$=zero amps does not necessarily imply that $W_0$=zero watts).

Figure 1:
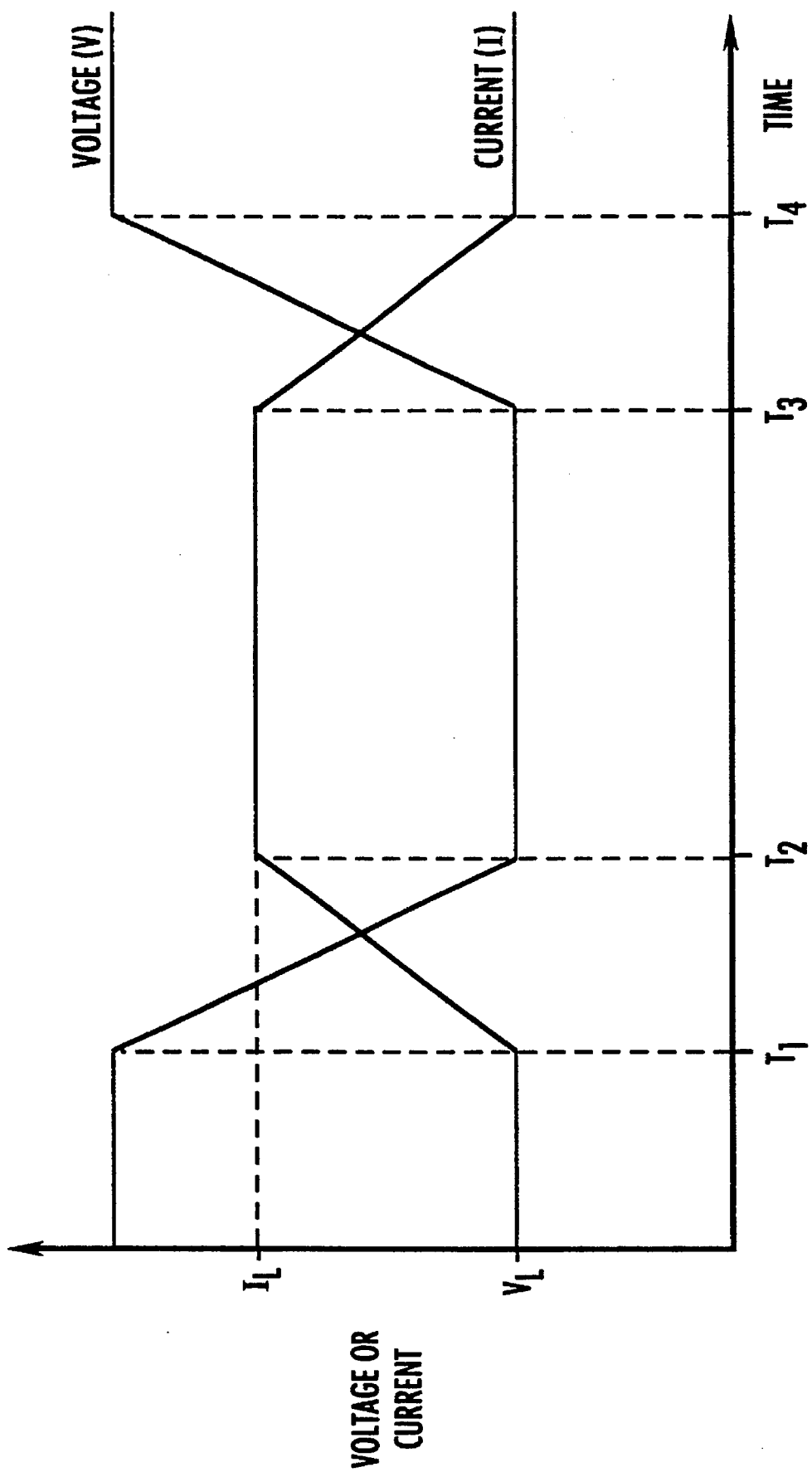
FIG. 1 shows a diagram of voltage and current levels during both switching times and normal operating times of a switching device.

More power is generated as the switching frequency of the switching device increases, since more power is generated during switching intervals (i.e., between times $T_1$ and $T_2$ of FIG. 1) than during normal operating intervals (i.e., between times $T_2$ and $T_3$ of FIG. 1).

Referring back to FIG. 2, assume that a power level of $W_3$ watts is the maximum amount of power that the switching device can reliably dissipate (by heat transfer to the environment) during operation, and that if any additional power is generated, such as $W_4$ watts, the switching device will absorb the power in the form of thermal energy which will result in an increase in the operating temperature of the switching device and may cause damage to the switching device. The frequency slider utilizes the measured operating current (i.e. the load current) supplied to the electric device, such as a motor or other type of load, that is controlled by the switching device, to estimate the operating temperature of the switching device. Since the operating (or load) current supplied to the electric device is typically the parameter that is being controlled, its value is readily measurable and continuously available for use by the frequency slider.

Figure 3:
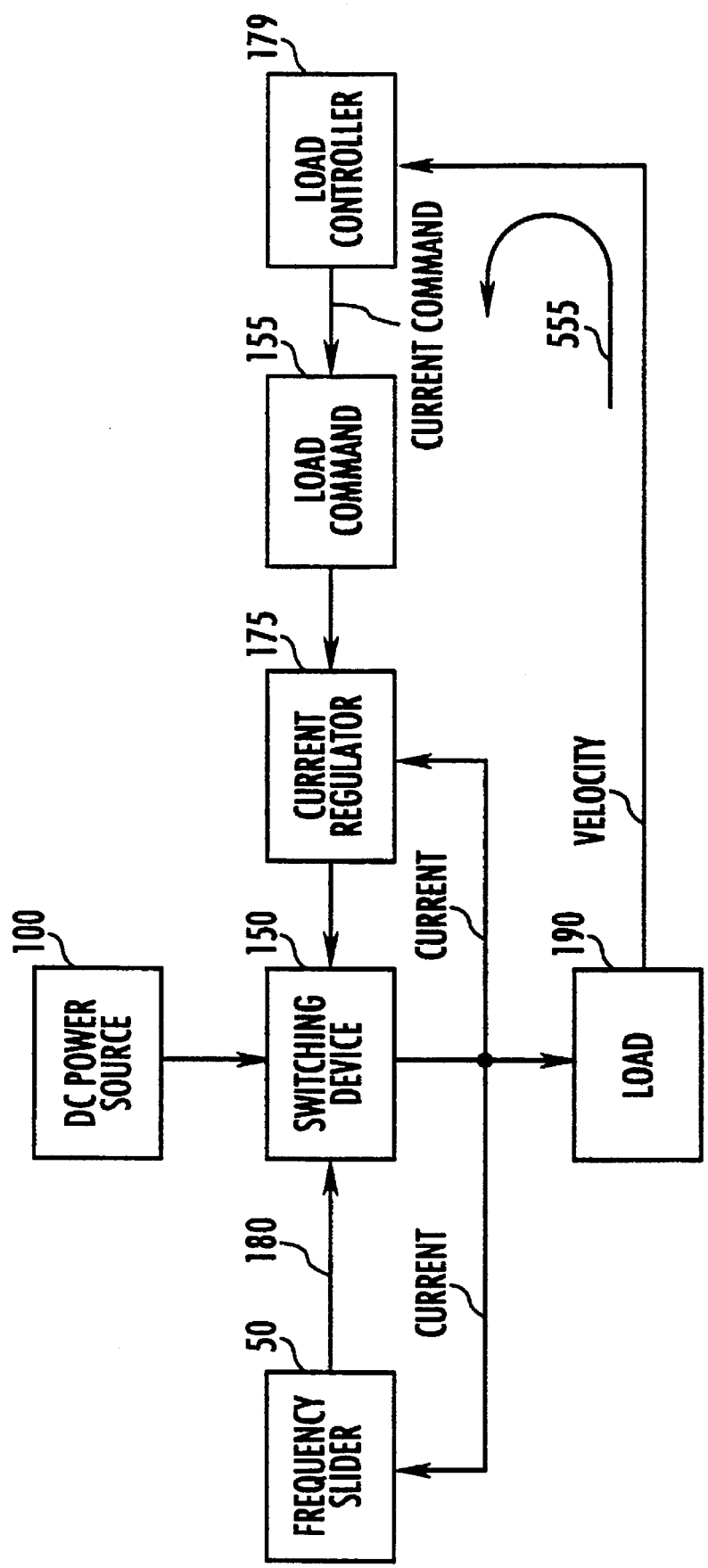
FIG. 3 shows a switching device connected to a DC power source and to an electric device which it controls, with the switching device receiving a switching signal from the frequency slider according to the preferred embodiment of the invention.

FIG. 3 shows a block diagram of a direct current (DC) source 100 supplying direct current to a switching device 150. The switching device 150 receives a switching frequency signal 180 from a frequency slider 50, and based on that switching frequency signal 180, the switching device 150 converts the DC current received from the DC source 100 into an alternating current (AC). The alternating current output from the switching device 150 is supplied to an electric load, such as an AC motor 190. The type of load 190 that may be controlled by switching device 150 include, but are not limited to, a motor, a transducer, a solenoid, and a resistive load.

The switching device 150 also receives a control signal from a current regulator circuit 175, which determines an appropriate duty cycle of the alternating current (i.e., load current) supplied to the electric load 190, based on a command received from the load command circuit 155. The load command circuit 155 determines an appropriate amount of current to be supplied to the electric load 190 based on a current command signal received from a load controller circuit 179, which is directly connected to the electric load 190.

The current regulator circuit 175 controls the current loop of the electric load 190, while the frequency slider 50 controls the switching frequency applied to the electric load 190. Accordingly, the switching frequency of the switching device 150 can be set to not exceed the maximum power level (e.g., $W_3$ watts) of the switching device 150, based on a particular level of measured load current.

In the frequency slider 50, a threshold power level below the maximum power level $W_3$ is preset externally, and in FIG. 2, this corresponds to the threshold power level of $W_2$ watts. If the switching device 150 is operating at a switching frequency of $F_2$ switches per second, then the measured current level of $I_2$ amps will result in a predicted power level of $W_2$ watts. When the measured load current level indicates that the threshold power level of $W_2$ watts is reached, then the switching frequency of the switching device 150 will be gradually reduced to an appropriate switching rate by the frequency slider 50 as the load current is likewise adjusted in order to keep the power generated by the switching device 150 at or below the maximum power level of $W_3$ watts, as will be described more fully below.

In FIG. 2, the frequency slider 50 reduces the switching frequency of the switching device 150 from $F_2$ switches per second down to $F_1$ switches per second as the current increases from $I_2$ amps to $I_3$ amps. During the lowering of the switching rate, the switching device 150 operates approximately along the power curve 52, which is shown as a line between power curves $F_1$ and $F_2$ of FIG. 2. This way, the power dissipation of the switching device 150 is maintained at a somewhat constant level; i.e., the total loss in watts remains somewhat constant. That is, as the current of the switching device 150 is increased, the frequency of the switching device 150 is decreased. A constant level of power is thereby lost in the switching device 150.

Figure 4:
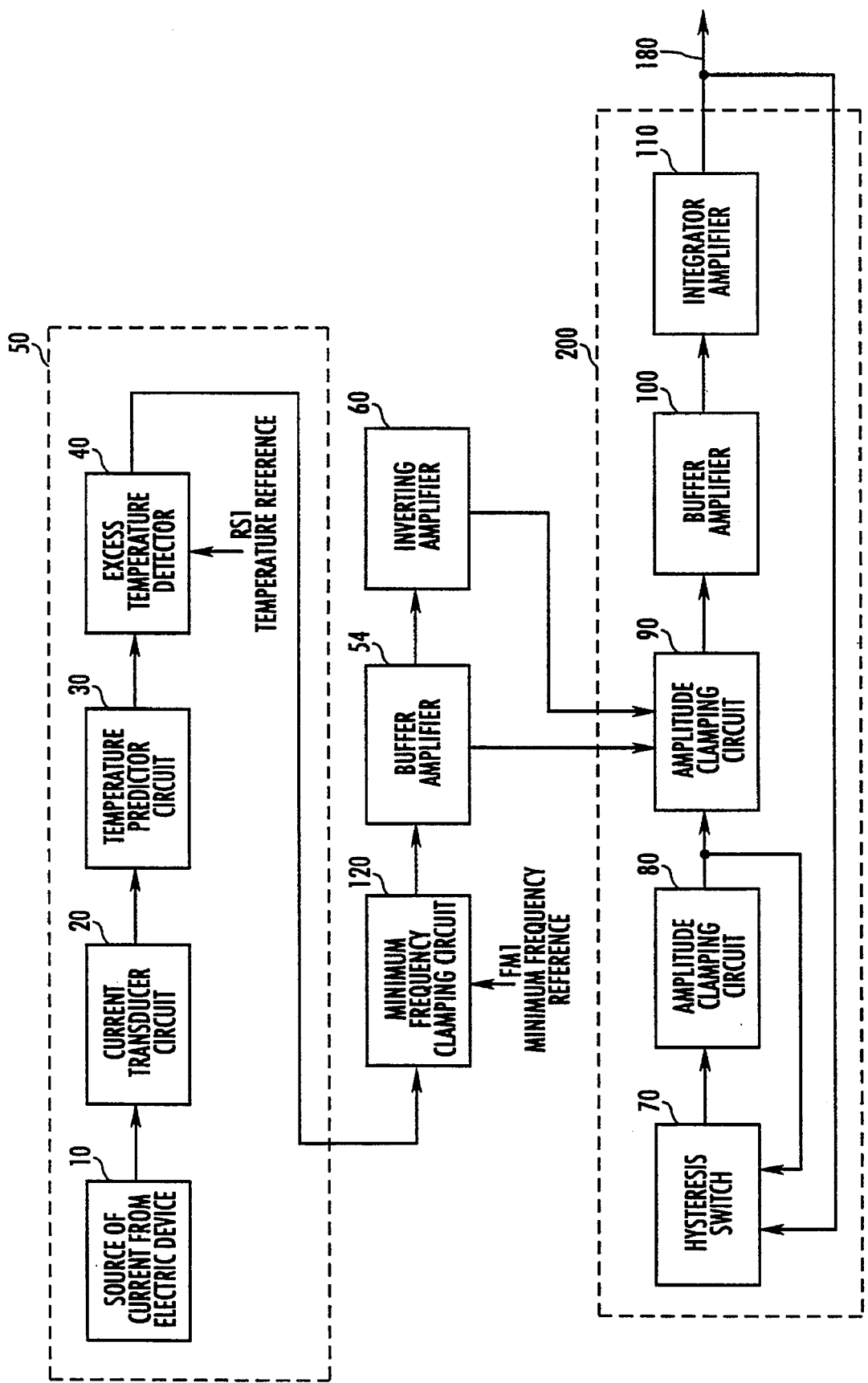
FIG. 4 shows a block diagram of a frequency slider for controlling a switching device according to a first embodiment of the invention.

FIG. 4 shows a block diagram of the frequency slider 50 according to a first embodiment of the invention. A source of current supplied by the switching device 150 is measured by a current measuring device 10. As seen in FIG. 3, that current measuring device may be a circuit receiving a level of current from the electric load 190. The current regulator 175 sends a command to the switching device 150 to supply an appropriate duty cycle for the electric load 190.

Referring now to FIG. 4, a current transducer circuit 20 converts the received current into a voltage value. A temperature predictor circuit 30 is provided with the voltage value, and based on that voltage value, estimates the temperature of the switching device 150. The estimation of the temperature of the switching device 150 may be implemented in either software or hardware. For example, a second or higher order differential equation may be utilized in order to estimate the temperature of the switching device 150 as is known by one of ordinary skill in the art. Based on several input parameters, such as ambient air temperature and other thermal characteristics of the switching device 150, an accurate estimation of the temperature of the switching device 150 may be obtained based upon the current of the switching device 150.

Once the temperature is estimated by the temperature predictor circuit 30, an excess temperature detector 40 compares that estimated temperature to a temperature reference signal $RS_1$. The excess temperature detector 40 has a minimum temperature threshold level $RS_0$ stored within the excess temperature detector 40 upon detection of which the excess temperature detector 40 turns itself on. The excess temperature detector 40 also stores a maximum temperature threshold level $RS_1$, which corresponds to a preset temperature at or above which the switching device cannot go beyond for purposes of thermal stability.

If a voltage value is input to the temperature predictor circuit 30 corresponding to an estimated temperature level of the switching device 150 below the minimum temperature threshold level $RS_0$, then there is no need to perform frequency sliding by the frequency slider 50, and the switching device 150 continues to operate at the selected frequency $F_2$, thereby following the $F_2$ curve as shown in FIG. 2. Referring back to FIG. 4, if the estimated temperature is determined to be above the temperature reference signal $RS_1$, then the switching frequency of the switching device 150 is reduced by a predetermined amount which can be either a preset amount, such as 10 Hz, or be determined based upon the difference between the predicted temperature and the temperature reference signal $RS_1$. In such a configuration, a larger temperature difference would result in a greater reduction of the switching frequency of the switching device 150.

A minimum frequency clamping circuit 120 is used to ensure that the switching frequency of the switching device 150 never drops below a minimum switching frequency level, $F_1$. If the switching frequency of the switching device 150 was allowed to drop below the minimum switching frequency level $F_1$, then the current loop of the switching device 150 would begin to run into the load control loop (555 of FIG. 3) of the electric load 190 applied to the switching device 150, which would cause an unstable condition. The minimum frequency clamping circuit 120 prevents this condition by ensuring that the switching frequency of the switching device 150 is always above the critical frequency of the load control loop 555.

In FIG. 3, the current regulator 175 controls the current supplied to the electric load 190. The current regulator 175 controls the amount of ON and OFF time for each switching cycle, i.e., the duty cycle, while the frequency slider 50 controls the rate of the switching cycles.

Referring back to FIG. 2, assume that $I_2$ is 70% of the maximum current carrying capacity of the switching device 150, and that $I_3$ is 100% of the maximum current carrying capacity of the switching device 150. As the current increases in the switching device 150 while the switching device 150 is switching at a rate $F_2$ times per second, the power curve follows the $F_2$ curve from $I_1$ to $I_2$ amps. At a current level of $I_2$ amps, the current transducer circuit 20 outputs a signal level corresponding to that amount of current, $I_2$ amps. That signal level is converted to a voltage level and used by the temperature predictor circuit 30 of FIG. 4. The switching frequency of the switching device 150 is gradually reduced so that it follows the power curve 52 to thereby operate the switching device 150 along the power curve 52 instead of along the $F_2$ curve.

In order to maintain a somewhat constant amount of power to the switching device 150, the switching frequency must be decreased from at the same time the current is increased, as is shown in FIG. 2. The $F_1$ curve corresponds to a reduced switching rate of $F_1$ switches per second. The time when the switching device 150 is operating along the power curve 52 corresponds to a gradual reduction of the switching rate until a minimum switching frequency of $F_1$ switches per second is reached.

The foregoing example assumes that the switching frequency $F_1$ corresponds to the minimum frequency reference $FM_1$. When the switching frequency reaches the minimum switching frequency $F_1$, the switching rate of the switching device 150 is clamped at the rate $F_1$, and the switching device 150 follows the $F_1$ curve up to the maximum current output, $I_3$ amps. This prevents the maximum power generated by the switching device 150 from exceeding $W_3$ watts at any time, even at the maximum current for the switching device 150.

It is important to note that the thermal energy, or heat, generated by power losses during the ON and OFF switching periods must be reduced during the switching transitions that occur due to the slew rate of the voltage and current values during these switching periods. One way to reduce this generated heat is to reduce the switching frequency of the switching device 150. A reduced switching frequency provides the switching device 150 with the additional time to dissipate thermal energy (or heat) generated by power losses during the longer operational periods that result between switching intervals.

Referring back to FIG. 4, buffer amplifier 54 and inverting amplifier 60 together act as a voltage controller for an oscillator circuit 200 of the frequency slider 50. The oscillator circuit 200 includes a hysteresis switch 70, an amplitude clamping circuit 80, an amplitude clamping circuit 90, a buffer amplifier 100, and an integrator amplifier 110. The oscillator circuit 200 includes a hysteresis feedback signal that is fed back from the amplitude clamping circuit 80 to the hysteresis switch 70, and a triangle frequency feedback signal that is fed back from the integrator amplifier 110 to the hysteresis switch 70.

The oscillator circuit 200 corresponds to a free-running oscillator that generates a triangular wave, although it can generate any type of periodic wave, such as a sinusoid, and still fulfill the function of the invention. Most every type of switching device 150, such as a pulse width modulator device or a variable voltage-variable frequency device, requires some kind of clocking oscillator that outputs a fixed frequency, such as that shown as the oscillator circuit 200 in FIG. 4.

As the voltage supplied by the inverting amplifier 60 to the amplitude clamping circuit 90 increases, the frequency of the triangular wave output from the integrator amplifier 110 of the oscillator circuit 200 decreases. Conversely, as the voltage supplied by the inverting amplifier 60 to the amplitude clamping circuit 90 increases, the frequency of the triangular wave output from the integrator amplifier 110 of the oscillator circuit 200 decreases. The output of the oscillator circuit 200 is used to control the switching frequency of the switching device 150 and to reduce the switching frequency to an appropriate rate to avoid overheating of the switching device 150.

FIG. 3 shows an oscillating signal 180 supplied to the switching device 150 from the frequency slider 50. A higher switching frequency typically results in a better response from the electric load 190 under control of the switching device 150, and operates the electric load 190 at a frequency where there is not normally undesirable audible noise.

When the switching frequency supplied to the electric load 190 is lowered, or slid down from a higher frequency $F_2$ to a lower frequency $F_1$, audible noise may issue from the electric load 190. However, the alternative to audible noise may be thermal damage to the switching device 150, which may operate unreliably or fail due to the amount of power generated during the switching intervals if the switching frequency is not reduced to an appropriate level during this time. The temperature predictor circuit 30 of FIG. 4 allows operation at optimal switching frequency for a given current of the switching device 150. In addition, there is no need to measure the actual temperature of the switching device 150, which would require a separate temperature sensor as is utilized in conventional devices as described earlier. Furthermore, there is no requirement to preset or load any initial values for the frequency slider 50.

In certain applications, if the switching frequency of the switching device 150 is reduced below a particular minimum frequency, a high amount of ripple current may be supplied to the electric load 190, which may cause thermal damage or other harm to the electric load 190. Thus, a minimum switching frequency $F_1$ is set in the frequency slider 50 in order to ensure that the switching device 150 never reduces below a switching frequency that may damage the electric load 190 that the switching device 150 controls.

Although the above description of the frequency slider 50 uses a reduction in switching frequency in order to reduce heat generated by the switching device 150 during switching frequency intervals, the frequency slider 50 can also be utilized to increase the switching frequency of the switching device 150 if thermal conditions permit. Once the estimated temperature of the switching device 150 reaches the maximum temperature threshold level $RS_1$, and operation is transferred by the frequency slider from along power curve $F_2$ to along power curve $F_1$ (i.e. along either power curve, however, for each operating current there is a corresponding switching frequency). Under such operating conditions, the estimated temperature of the switching device 150 may drop. Accordingly, referring back to FIG. 2, if the switching device 150 is operating at a current level between $I_1$ and $I_2$ amps, and if the switching device 150 is also operating at a switching frequency of $F_1$, then the frequency slider 50 can be configured to monitor and to gradually increase the switching frequency of the switching device 150 to $F_2$. The switching device 150 will then operate at the $F_2$, the increased switching rate, as long as the measured current is below $I_2$ amps. Operation at the increased frequency, $F_2$, will result in a smoother signal supplied to the electric load 190 under control of the switching device 150. Of course, if the current does increase to $I_2$ amps, the frequency slider 50 will then gradually reduce the switching frequency of the switching device 150 from a switching rate of $F_2$ to a switching rate of $F_1$, as is shown along power curve 52 in FIG. 2.

Similarly, the frequency slider 50 can operate so as to allow the switching device 150 to exceed the maximum power level, $W_3$ watts, for a short period of time, in order to achieve a desired speed of the electric load 190 without harming the switching device 150. The frequency slider 50 is configured to allow more output current for the same temperature, due to a lowering of the switching frequency of the switching device 150 under control of the frequency slider 50. Essentially, the system acts as if the temperature of the switching device 150 is held constant as the current increases or decreases.

Figure 5:
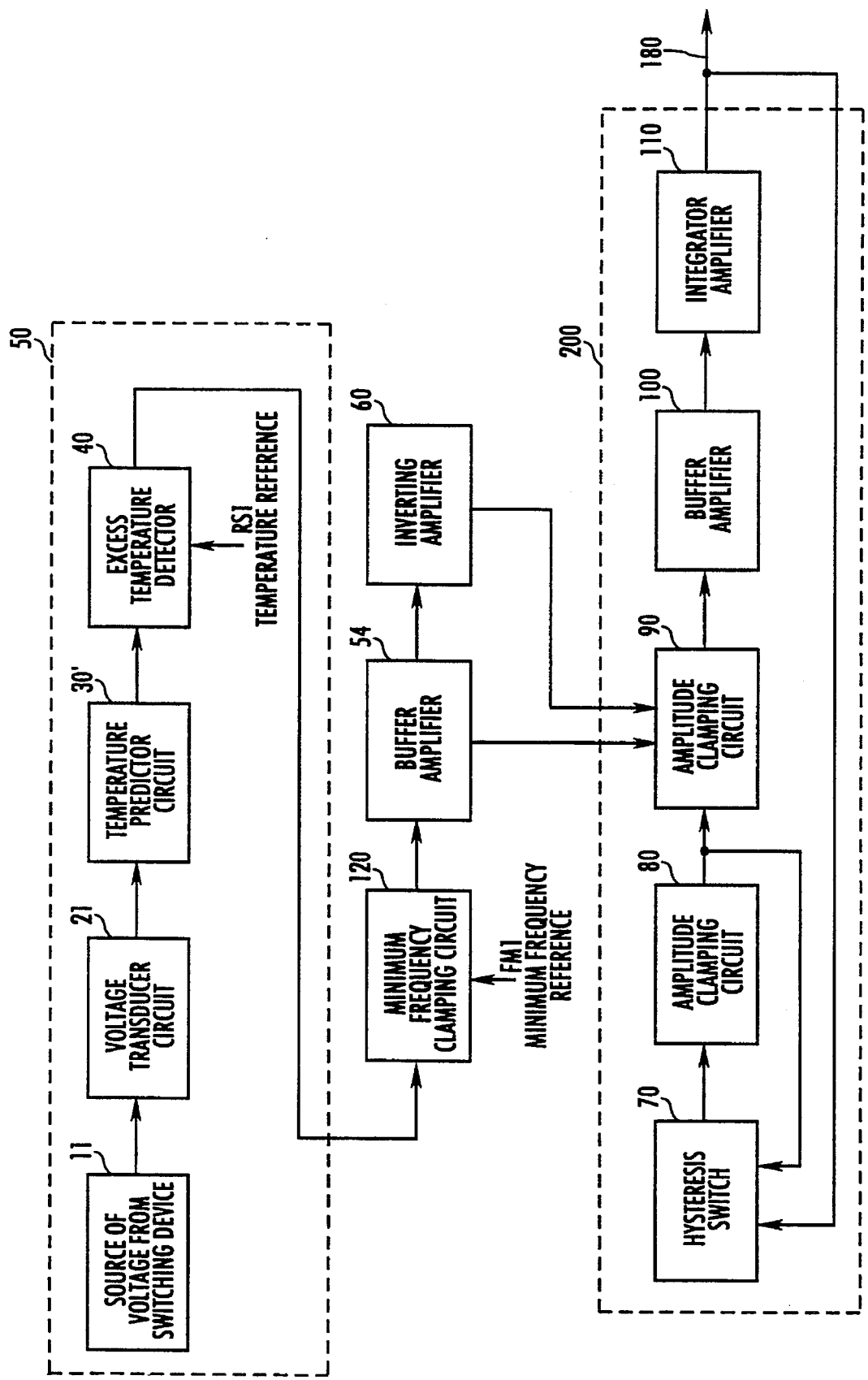
FIG. 5 shows a block diagram of a frequency slider for controlling a switching device according to a second embodiment of the invention.

FIG. 5 shows a second embodiment of the system according to the invention. In FIG. 5, instead of using a current output from the switching device to determine the temperature of the switching device, a source of voltage across the switching device is used instead, as shown as block 11. This source of voltage 11 is supplied to a voltage transducer 21, which outputs a voltage signal to the temperature predictor circuit 30$a$. The temperature predictor circuit 30$a$ predicts the temperature of the switching device based on the voltage signal indicative of the voltage across the switching device. The rest of the system according to the second embodiment is similar to the system according to the first embodiment as shown in FIG. 4 and as described earlier.

Figure 6:
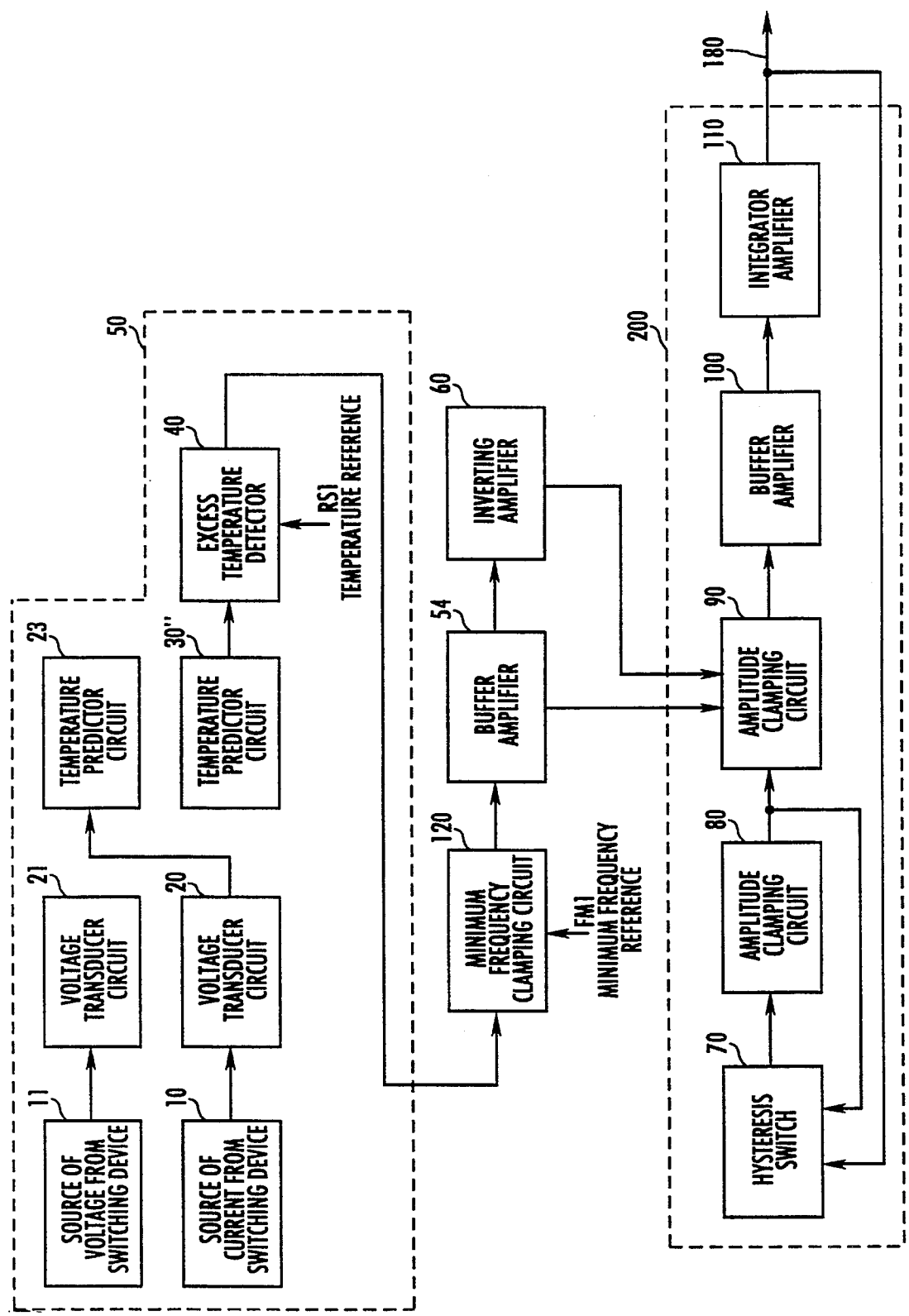
FIG. 6 shows a block diagram of a frequency slider for controlling a switching device according to a third embodiment of the invention.

FIG. 6 shows a third embodiment of the system according to the invention. In FIG. 6, a signal corresponding to a current of the switching device and a signal corresponding to a voltage across the switching device are supplied to a multiplier 23, which outputs a control signal to the temperature predictor circuit 30$b$ that is based on both the current and the voltage of the switching device. The system according to the third embodiment allows for a more accurate estimate of the temperature of the switching device since the temperature estimate can be based on two parameters (voltage and current) instead of just one parameter (voltage or current) in the systems according to the first and second embodiments, but the system according to the third embodiment also requires more elements.

While a preferred embodiment of the invention has been described herein, other modifications to the invention may become apparent to one of ordinary skill in the art without departing from the scope of the invention as described herein. For example, the circuits of the frequency slider 50 can be implemented in appropriately programmed discrete or integrated digital circuits, such as discrete logic circuits, including a microprocessor or digital signal processor.

What is claimed is:

1. A method for controlling the temperature of a switching device for switching a current at a desired frequency to power an electric device, comprising the steps of:

(a) generating a signal representative of a characteristic of said switching device;

(b) predicting a temperature of said switching device based on said signal;

(c) comparing said predicted temperature to a predetermined temperature reference level; and (d) reducing a switching frequency of said switching device below said desired frequency when said predicted temperature exceeds said predetermined temperature reference level.

2. A method for controlling the temperature of a switching device operating to switch a current at a desired frequency to power an electric device according to claim 1, wherein said signal is representative of said current output from said switching device.

3. A method for controlling the temperature of a switching device operating to switch a current at a desired frequency to power an electric device according to claim 1, wherein said signal is representative of a voltage across said switching device.

4. A method for controlling the temperature of a switching device operating to switch a current at a desired frequency to power an electric device according to claim 1, wherein said signal is representative of both said current output from said switching device and a voltage across said switching device.

5. A method for controlling the temperature of a switching device for switching a current at a desired frequency to power an electric device according to claim 1, wherein said switching frequency is reduced in the step (d) in a linear manner.

6. A method for controlling the temperature of a switching device for switching a current at a desired frequency to power an electric device according to claim 1, wherein when said switching frequency is reduced to a preset minimum switching frequency in the step (d), said switching frequency is maintained at said minimum switching frequency.

7. A method for controlling the temperature of a switching device for switching a current at a desired frequency to power an electric device according to claim 1, wherein the predicting step (b) is performed by a software model of said switching device.

8. A method for controlling the temperature of a switching device for switching a current at a desired frequency to power an electric device according to claim 1, wherein the predicting step (b) is performed by a hardware model of said switching device.

9. An apparatus for controlling the temperature of a switching device for switching a current at a desired frequency to power an electric device, comprising:

a current transducer circuit coupled to said switching device, said current transducer configured to receive said current from said switching device and to output a signal level representative of said current;

a temperature predictor circuit coupled to said current transducer circuit and configured to predict a temperature of said switching device based on said signal level;

a comparison circuit coupled to said temperature predictor and configured to compare said predicted temperature of said switching device to a predetermined temperature reference and to output a comparison signal indicative of whether said predicted temperature of said switching device is greater than or less than or equal to said predetermined temperature reference;

a frequency clamping circuit coupled to said comparison circuit and configured to clamp a switching frequency of said switching device to below a maximum frequency level when said comparison signal indicates that said predicted temperature of said switching device is greater than said predetermined temperature reference; and a power dissipation lowering circuit connected to said frequency clamping circuit and configured to lower said switching frequency by a predetermined amount when said comparison signal indicates that said predicted temperature of said switching device is greater than said predetermined temperature reference.

10. An apparatus for controlling the temperature of a switching device for switching a current at a desired frequency to power an electric device according to claim 9, wherein said switching frequency is lowered at a constant rate by said temperature lowering circuit when said comparison signal indicates that said predicted temperature of said switching device is greater than said predetermined temperature reference.

11. An apparatus for controlling the temperature of a switching device for switching a current at a desired frequency to power an electric device according to claim 9, wherein said comparison signal has one of two possible states at any given time, wherein said comparison signal being in a first state when predicted temperature of said switching device is greater than said predetermined temperature reference, and said comparison signal being in a second state when said predicted temperature of said switching device is less than or equal to said predetermined temperature reference.

12. An apparatus for controlling the temperature of a switching device according to claim 9, further comprising:

a minimum frequency clamping circuit connected to said power dissipation lowering circuit and configured to maintain said switching frequency at a predetermined minimum frequency threshold.

13. An apparatus for controlling the temperature of a switching device operating to switch a current at a desired frequency to power an electric device according to claim 9, wherein said power dissipation lowering circuit comprises:

a first buffer amplifier coupled to said frequency clamping circuit and configured to output a buffered frequency signal as a result thereof;

an inverting amplifier coupled to said first buffer amplifier and configured to output an inverted buffered frequency signal as a result thereof;

a hysteresis switch configured to receive a hysteresis feedback signal and a triangle feedback signal and to output a switch signal as a result thereof;

a first amplitude clamping circuit configured to clamp said switch signal to a maximum level when said switch signal exceeds a predetermined clamping level, said first amplitude clamping circuit configured to output a first clamped signal as said hysteresis feedback signal as a result thereof;

a second amplitude clamping circuit coupled to said first amplitude clamping circuit, said first buffer amplifier and said second inverter amplifier, said second amplitude clamping circuit configured to output a second clamped signal, wherein said second amplitude clamping circuit permits said hysteresis feedback signal to pass through said second amplitude clamping circuit unmodified as a second clamped signal when said buffered frequency signal is below a second predetermined level and said inverted buffered frequency signal is above a third predetermined level, and wherein said hysteresis feedback signal is limited by said second amplitude clamping circuit to a value below a second clamped level as said second clamped signal otherwise; and an integrator amplifier configured to receive said second clamped signal and to output said triangle feedback signal as a result thereof, wherein said triangle feedback signal corresponds to said switching frequency for said switching device.

14. An apparatus for controlling the temperature of a switching device operating to switch a current at a desired frequency to power an electric device according to claim 9, wherein said temperature predictor circuit predicts a junction temperature of said switching device.

15. An apparatus for controlling the temperature of a switching device operating to switch a current at a desired frequency to power an electric device according to claim 9, wherein said temperature predictor circuit predicts said junction temperature based on a software model of said switching device.

16. An apparatus for controlling the temperature of a switching device operating to switch a current at a desired frequency to power an electric device according to claim 9, wherein said temperature predictor circuit predicts said junction temperature based on a hardware model of said switching device.

17. An apparatus for controlling the temperature of a switching device for switching a current at a desired frequency to power an electric device, comprising:

a voltage measuring circuit coupled to said switching device and configured to output a signal representative of a voltage across said switching device;

a voltage transducer circuit coupled to said voltage measuring circuit and configured to receive said signal representative of said voltage across said switching device and to output a voltage signal as a result thereof;

a temperature predictor circuit coupled to said voltage transducer circuit and configured to predict a temperature of said switching device based on said voltage signal;

a comparison circuit coupled to said temperature predictor and configured to compare said predicted temperature of said switching device to a predetermined temperature reference and to output a comparison signal indicative of whether said predicted temperature of said switching device is greater than or less than or equal to said predetermined temperature reference;

a frequency clamping circuit coupled to said comparison circuit and configured to clamp a switching frequency of said switching device to below a maximum frequency level when said comparison signal indicates that said predicted temperature of said switching device is greater than said predetermined temperature reference; and a power dissipation lowering circuit connected to said frequency clamping circuit and configured to lower said switching frequency by a predetermined amount when said comparison signal indicates that said predicted temperature of said switching device is greater than said predetermined temperature reference.

18. An apparatus for controlling the temperature of a switching device for switching a current at a desired frequency to power an electric device according to claim 17, wherein said switching frequency is lowered at a constant rate by said temperature lowering circuit when said comparison signal indicates that said predicted temperature of said switching device is greater than said predetermined temperature reference.

19. An apparatus for controlling the temperature of a switching device according to claim 17, further comprising:

a minimum frequency clamping circuit connected to said power dissipation lowering circuit and configured to maintain said switching frequency at a predetermined minimum frequency threshold.

20. An apparatus for controlling the temperature of a switching device operating to switch a current at a desired frequency to power an electric device according to claim 17, wherein said power dissipation lowering circuit comprises:

a first buffer amplifier coupled to said frequency clamping circuit and configured to output a buffered frequency signal as a result thereof;

an inverting amplifier coupled to said first buffer amplifier and configured to output an inverted buffered frequency signal as a result thereof;

a hysteresis switch configured to receive a hysteresis feedback signal and a triangle feedback signal and to output a switch signal as a result thereof;

a first amplitude clamping circuit configured to clamp said switch signal to a maximum level when said switch signal exceeds a predetermined clamping level, said first amplitude clamping circuit configured to output a first clamped signal as said hysteresis feedback signal as a result thereof;

a second amplitude clamping circuit coupled to said first amplitude clamping circuit, said first buffer amplifier and said inverter amplifier, said second amplitude clamping circuit configured to output a second clamped signal, wherein said second amplitude clamping circuit permits said hysteresis feedback signal to pass through said second amplitude clamping circuit unmodified as a second clamped signal when said buffered frequency signal is below a second predetermined level and said inverted buffered frequency signal is above a third predetermined level, and wherein said hysteresis feedback signal is limited by said second amplitude clamping circuit to a value below a second clamped level as said second clamped signal otherwise; and an integrator amplifier configured to receive said second clamped signal and to output said triangle feedback signal as a result thereof, wherein said triangle feedback signal corresponds to said switching frequency for said switching device.

21. An apparatus for controlling the temperature of a switching device operating to switch a current at a desired frequency to power an electric device according to claim 17, wherein said temperature predictor circuit predicts a junction temperature of said switching device.

22. An apparatus for controlling the temperature of a switching device operating to switch a current at a desired frequency to power an electric device according to claim 17, wherein said temperature predictor circuit predicts said junction temperature based on a software model of said switching device.

23. An apparatus for controlling the temperature of a switching device operating to switch a current at a desired frequency to power an electric device according to claim 17, wherein said temperature predictor circuit predicts said junction temperature based on a hardware model of said switching device.

24. An apparatus for controlling the temperature of a switching device for switching a current at a desired frequency to power an electric device, comprising:

a current measuring circuit coupled to said switching device and configured to output a first signal representative of said current output from said switching device;

a voltage measuring circuit coupled to said switching device and configured to output a second signal representative of a voltage across said switching device;

a temperature predictor circuit coupled to said current measuring circuit and said voltage measuring circuit and configured to predict a temperature of said switching device based on said first and second signals;

a comparison circuit coupled to said temperature predictor and configured to compare said predicted temperature of said switching device to a predetermined temperature reference and to output a comparison signal indicative of whether said predicted temperature of said switching device is greater than or less than or equal to said predetermined temperature reference;

a frequency clamping circuit coupled to said comparison circuit and configured to clamp a switching frequency of said switching device to below a maximum frequency level when said comparison signal indicates that said predicted temperature of said switching device is greater than said predetermined temperature reference; and a power dissipation lowering circuit connected to said frequency clamping circuit and configured to lower said switching frequency by a predetermined amount when said comparison signal indicates that said predicted temperature of said switching device is greater than said predetermined temperature reference.

25. An apparatus for controlling the temperature of a switching device operating to switch a current at a desired frequency to power an electric device, comprising:

means for generating a signal representative of said switching device;

means for predicting a temperature of said switching device based on said signal;

means for comparing said predicted temperature to a predetermined temperature reference level; and means for reducing a switching frequency of said switching device below said desired frequency when said predicted temperature exceeds said predetermined temperature reference level.

26. An apparatus for controlling the temperature of a switching device operating to switch a current at a desired frequency to power an electric device according to claim 25, wherein said signal is based on said current output from said switching device.

27. An apparatus for controlling the temperature of a switching device operating to switch a current at a desired frequency to power an electric device according to claim 25, wherein said signal is based on a voltage across said switching device.

28. An apparatus for controlling the temperature of a switching device operating to switch a current at a desired frequency to power an electric device according to claim 25, wherein said signal is based on both said current output from said switching device and a voltage across said switching device.

29. An apparatus for controlling the temperature of a switching device operating to switch a current at a desired frequency to power an electric device according to claim 25, wherein said switching frequency is reduced in a linear manner by said means for reducing a switching frequency.

30. An apparatus for controlling the temperature of a switching device operating to switch a current at a desired frequency to power an electric device according to claim 25, wherein when said switching frequency is reduced by said means for reducing a switching frequency down to a preset minimum switching frequency, said switching frequency is maintained above said minimum switching frequency.

31. An apparatus for controlling the temperature of a switching device operating to switch a current at a desired frequency to power an electric device according to claim 25, wherein said means for predicting a temperature is performed by a software model of said switching device.

32. An apparatus for controlling the temperature of a switching device operating to switch a current at a desired frequency to power an electric device according to claim 25, wherein said means for predicting a temperature is performed by a hardware model of said switching device.

\* \* \* \* \*